United States Patent [19]

Hauser et al.

[11] Patent Number: 5,211,977
[45] Date of Patent: May 18, 1993

[54] PROCESS FOR THE PRODUCTION OF FLAVOURED PASTAS

[75] Inventors: Thomas W. Hauser; Jurg Lechthaler, both of Zurich, Switzerland

[73] Assignee: Nestec S.A., Vevey, Switzerland

[21] Appl. No.: 721,155

[22] Filed: Jun. 26, 1991

[30] Foreign Application Priority Data

Jul. 24, 1990 [CH] Switzerland .................... 2444/90

[51] Int. Cl.⁵ .................. A23L 1/0532; A23L 1/16
[52] U.S. Cl. .................... 426/557; 426/451; 426/516; 426/575
[58] Field of Search ............... 426/557, 451, 575, 516

[56] References Cited

U.S. PATENT DOCUMENTS

| 3,318,707 | 5/1967 | Ernst | 426/524 |
| 4,044,165 | 8/1977 | Baumann | 426/557 |
| 4,435,435 | 3/1984 | Hsu | 426/557 |
| 4,517,215 | 5/1985 | Hsu | 426/557 |
| 4,544,563 | 10/1985 | Lechthaler | 426/557 |

FOREIGN PATENT DOCUMENTS

667185A5  9/1988  Switzerland .

OTHER PUBLICATIONS

Translation of Swiss Patent No. CH 667 185 A5, Sep. 30, 1988.

Primary Examiner—Jeanette Hunter
Assistant Examiner—Mary S. Mims
Attorney, Agent, or Firm—Vogt & O'Donnell

[57] ABSTRACT

Dried pastas having a flavoring agent incorporated therein in an amount of at least 3% by weight are prepared by first mixing a ground starchy product, a starch, an emulsifier, a gelling agent, a flavoring agent, and softened water. The mixture then is extrusion-cooked and extruded to provide an extrusion-cooked, shaped pasta. The cooked, shaped pasta is contacted with an aqueous calcium solution and then dried.

13 Claims, No Drawings

PROCESS FOR THE PRODUCTION OF FLAVOURED PASTAS

BACKGROUND OF THE INVENTION

This invention relates to for the production of flavoured pastas.

It is known, for example from Swiss Patent No. 667 185, that pastas containing at least one additive intended to modify their flavour can be produced by direct incorporation in the dough of desired spices and/or seasonings in the form of powders or pieces, followed by rolling and drying to a dry matter content of 90 to 95%.

Another known process comprises preparing traditional pastas and impregnating their outer surface with a flavouring agent. However, this method has the disadvantage of a considerable loss of the flavours in water during cooking.

Now, it has been found that flavoured pastas which contain approximately 2 to 3% flavouring agent and which are traditionally prepared by kneading, rolling and/or extrusion are more friable, of inferior quality and have a softer texture in the mouth than traditional non-flavoured pastas. In addition, the losses of material during cooking of these flavoured pastas, for example in boiling water, are considerable.

The problem addressed by the present invention was to provide a process for the simple and rapid preparation of flavoured pastas comparable in quality and texture with traditional pastas, despite a high content of flavouring agent.

SUMMARY OF THE INVENTION

The process according to the invention comprises mixing a ground starchy product, a starch, an emulsifier, a gelling agent, a flavouring composition and softened water to prepare a mixture, extrusion cooking and extruding the mixture to prepare an extrusion-cooked, shaped pasta, contacting the cooked shaped pasta with an aqueous calcium chloride solution to obtain a calcium treated pasta and then drying the treated pasta. The process enables obtaining flavored pastas which contain at least 3% and up to about 10% by weight of a flavouring agent and have an agreeable taste and non-sticky texture.

DETAILED DESCRIPTION OF THE INVENTION

In practice of the invention the mixture prepared contains:
- 50 to 80 parts by weight of a ground starchy product,
- 15 to 25 parts by weight starch,
- 0.4 to 2 parts by weight emulsifier,
- 0.5 to 2 parts by weight of a gelling agent,
- 5 to 20 parts by weight of a flavouring composition, and softened water to give a dry matter content of 52 to 56%.

The ground starchy product may be, for example, a flour or semolina of hard wheat, soft wheat, corn, rice, potatoes, or any other starting material rich in starch. The starch may preferably be cornstarch or potato starch. The gelling agent may be, for example, an alginate, more particularly sodium alginate. The emulsifier may be, for example, a monoglyceride, a diglyceride, a triglyceride, or a derivative thereof or a mixture of these compounds. A flavouring composition suitable for use in the process according to the invention may contain:
- 3 to 8 parts by weight of at least one flavouring agent,
- 2 to 4 parts by weight of a flavour enhancer more particularly sodium glutamate,
- 0 to 4 parts by weight fermented soya sauce and
- 0 to 4 parts by weight sucrose.

The flavouring agent in this flavouring composition may be, in particular, garlic, onion, ginger, coriander, pepper, cumin, cardamom or any other flavouring substance of natural or synthetic origin, such as a cheese or vegetable powder.

The mixture is prepared in the presence of softened water to give a dry matter content of 52 to 56% by weight. It is important to prepare the mixture with softened water. This is because it has been found that, when the mixture is prepared with hard water, the extruded paste loses its cohesion and disintegrates. Softened water is understood to be a water in which the concentration of calcium ions is below $2.10^{-4}M$.

The pastas may then be shaped by extrusion cooking, for example in a twin-screw extruder, under a pressure of 20 to 100 bar and preferably 30 to 50 bar and at a temperature of approximately 60° to 105° C. The extrusion cooking step may last, for example, for approximately 30 to 80 seconds.

The pastas may then be rapidly contacted with an aqueous calcium solution, for example by spraying with a jet of this solution as they leave the extrusion die or by immersing them for a moment in a bath of this solution. A complex network between the gelling agent and the calcium, for example a network of calcium alginate, is thus formed in the pasta, strengthening the cohesion of the pastas and ensuring their stability during subsequent cooking. The extruded pastas are preferably passed continuously through an aqueous calcium chloride solution having a concentration of 10 to 30 $gl^{-1}$ for 2 to 10 seconds at a temperature of 20° to 70° C.

The pastas may then be dried, for example in a hot air dryer, at a moderate temperature of the order of 60° to 70° C. and in a relative humidity of 35 to 60%. To avoid the appearance of any cracks in the pastas, the pastas may be rapidly cooled after drying, for example with a stream of cold air at 30° to 38° C. and in a relative humidity of 90 to 95%. Flavoured pastas having a dry matter content of 87 to 95% by weight are thus obtained.

The dried pastas may then be stored, optionally with a garnish of vegetables, in dried form when they have a water activity of approximately 0.15 to 0.20 or in frozen form at a temperature of −15° to −30° C.

They may also be stored with a dry matter content of 91 to 92% and a water activity of approximately 0.50 to 0.55.

EXAMPLES

The invention is illustrated by the following Examples.

Example 1

A flavouring composition comprising 3.4 kg of a mixture of garlic, onion, ginger, coriander, pepper, turmeric, cardamom and cumin powders, 2.7 kg sodium glutamate, 2.0 kg fermented soya sauce in powder form and 1.9 kg sucrose is initially prepared.

A mixture comprising 75.5 kg of a soft wheat semolina, 16.9 kg cornstarch, 1.0 kg emulsifier, 0.7 kg sodium alginate, 5.8 kg of the flavouring composition and softened water to give a mixture having a dry matter content of approximately 54% by weight is then prepared.

This mixture is prepared in the first part of a twin-screw extruder rotating at 180 r.p.m. under a pressure of 25 bar, the extruder successively comprising various zones surrounded by separate jackets in which fluids are able to circulate at different temperatures. In the present case, the extruder comprises six successive zones in which the mixing, kneading, extrusion and cooking phases follow one another without interruption.

Thus, the mixture is formed in a first zone of the extruder, after which the dough obtained is kneaded and subjected to shearing in the following three zones in which temperatures of, respectively, 63°–65° C., 72°–74° C. and 90°–92° C. are maintained by the circulation of fluids at temperatures sufficient to keep the dough at a constant temperature of 102° to 105° C. In the last two zones, a temperature of 92° to 95° C. is maintained and the cooked dough issues from the extruder through an extrusion die consisting of a thick steel plate drilled with a plurality of holes approximately 0.6 mm in diameter. The passage of the dough through the extruder lasts about 45 to 55 seconds.

The pastas are then immediately immersed for about 4 to 6 seconds in an aqueous calcium chloride solution having a concentration of 18 gl$^{-1}$. They are then cut into long sections and arranged in balls.

The pastas are then dried in a hot air dryer for 1 h at a temperature of 60° C. and 55–60% relative humidity, then for 30 minutes at a temperature of 70° C. and 38–45% relative humidity and, finally, are cooled in a stream of cold air at 35° C. at 90–95% relative humidity.

Dried flavoured pastas having a dry matter content of 94 to 95% and a water activity of 0.15 to 0.20 are thus obtained.

The pastas may be prepared for eating by cooking for 4 to 5 minutes in boiling salted water in a quantity of 100 g pastas to 1 liter water. Pastas having an agreeable taste and a non-sticky texture are obtained.

Example 2

The dried flavoured pastas prepared in accordance with Example 1 may be incorporated in a complete dish in dehydrated form. For example, it is possible to prepare a meal comprising 100 g flavoured pastas and 100 g various dried vegetables, such as peas, beans, leeks and mushrooms. This meal may be placed in a perforated bag of suitable size consisting of a film of heat-resistant plastic, for example a 0.03 to 0.05 mm thick film, having a plurality of perforations to allow contact with boiling water. In preparation for eating, the bag containing the complete meal may either be placed in boiling salted water for 3 to 6 minutes or in cold salted water and then put in a microwave oven for 3 to 6 minutes. A complete ready-to-eat dish of non-sticky texture is obtained.

Example 3

Flavoured pastas having a dry matter content of 91.5 to 92% and a water activity of 0.50 to 0.54 are prepared in the same way as in Example 1.

The pastas are divided into several batches which are stored for a certain time at different temperatures. After storage, the pastas are cooked for 5 minutes in boiling water and then compared. The following results are obtained:

After storage for 3 months:
  the pastas stored at 4° C., 20° C. or 30° C. have an agreeable colour, odour, taste, consistency and appearance similar to control pastas which have not been stored;
  the pastas stored at 37° C. have a slightly less agreeable taste than the control pastas, their other characteristics being similar to those of the controls.

After storage for 6 months:
  the pastas stored at 4° C. or at 20° C. have similar characteristics to the control pastas;
  the pastas stored at 30° C. have a slightly less agreeable taste than the control pastas, their other characteristics being similar to those of the controls;
  the pastas stored at 37° C. have a slightly less agreeable odour and a less agreeable taste than the control pastas, their other characteristics being similar to those of the controls;

After storage for 9 months:
  the pastas stored at 4° C. or at 20° C. have similar characteristics to those of the control pastas;
  the pastas stored at 30° C. have a slightly less agreeable odour and taste than the control pastas, their other characteristics being similar to those of the controls;
  the pastas stored at 37° C. have a less agreeable odour and taste than the control pastas, their other characteristics being similar to those of the controls.

Accordingly, the flavoured pastas prepared in accordance with the present invention can be stored for at least three months at ambient temperature and for at least 9 months in refrigerated form without any change in their organoleptic qualities.

We claim:

1. A process for preparing a flavoured pasta comprising mixing a ground starchy product, a starch, an emulsifier, a gelling agent, a flavouring agent and softened water to prepare a mixture, extrusion cooking and extruding the mixture to prepare an extrusion-cooked, shaped pasta, contacting the cooked, shaped pasta with an aqueous calcium solution to obtain a calcium-treated pasta and drying the treated pasta to obtain a dried pasta, wherein the flavouring agent is mixed into the mixture in an amount so that the dried pasta contains the flavouring agent in an amount of at least 3% by weight.

2. A process according to claim 1 wherein the flavouring agent is in an amount of from 3% to about 10% by weight of the dried pasta.

3. A process according to claim 1 wherein the mixture is extrusion-cooked under a pressure of from 20 bar to 100 bar at a temperature of from about 60° C. to 105° C.

4. A process according to claim 1 wherein the mixture is extrusion-cooked under a pressure of from 20 bar to below 70 bar at a temperature of from about 60° C. to about 105° C.

5. A process according to claim 1 wherein the mixture is extrusion-cooked under a pressure of from 20 bar to 50 bar at a temperature of from about 60° C. to 105° C.

6. A process according to claim 3 or 4 or 5 wherein the mixture is extrusion-cooked for from about 30 seconds to about 80 seconds.

7. A process according to claim 3 or 4 or 5 wherein the flavouring agent is in amount of from 3% to about 10% by weight of the dried pasta.

8. A process according to claim 1 wherein the mixture has a dry matter content of from 52% to 56% by weight.

9. A process according to claim 1 wherein the mixture has a dry matter content of from 52% to 56% by weight and contains from 50 parts to 80 parts by weight of the starchy product, from 15 parts to 25 parts by weight of the starch, from 0.4 parts to 2 parts by weight of the emulsifier, from 0.5 parts to 2 parts by weight of the gelling agent and from 5 parts to 20 parts by weight of a flavouring composition.

10. A process according to claim 9 wherein the flavouring composition contains from 3 to 8 parts by weight of at least one flavouring agent.

11. A process according to claim 1 wherein the aqueous calcium solution is a calcium chloride solution and has a concentration of from 10 g/l to 30 g/l and a temperature of from 20° C. to 70° C. and the cooked shaped pasta is contacted with the solution for from 2 seconds to 10 seconds.

12. A process according to claim 1 wherein the gelling agent is an alginate.

13. A process according to claim 2 wherein the starch is selected from the group of starches consisting of corn starch and potato starch.

* * * * *